United States Patent Office 3,564,035
Patented Feb. 16, 1971

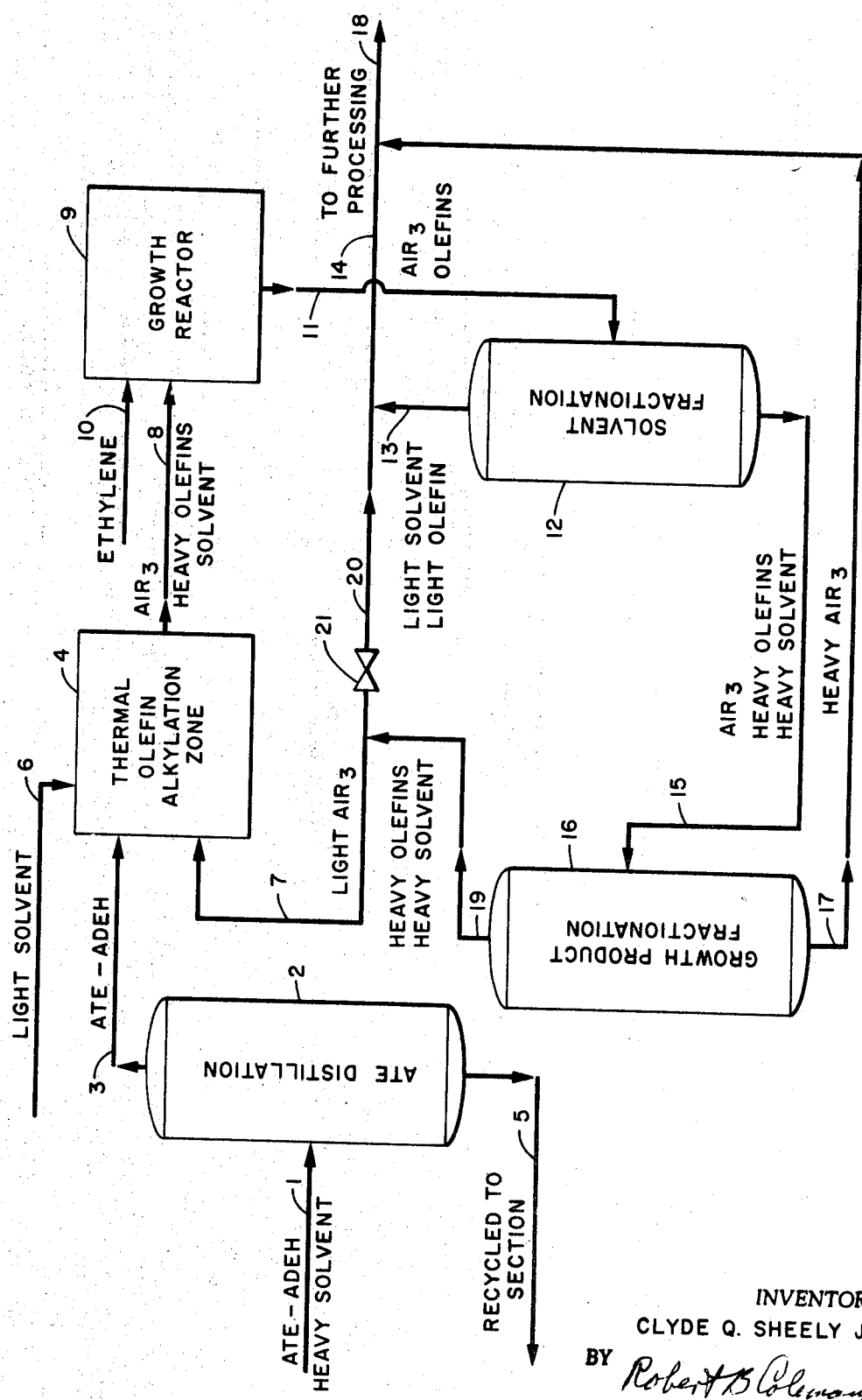

3,564,035
CONTROL OF POISSON DISTRIBUTION IN ALUMINUM ALKYL GROWTH PRODUCT
Clyde Q. Sheely, Jr., Ponca City, Okla., assignor to Continental Oil Company, Ponca City, Okla., a corporation of Delaware
Filed Aug. 8, 1968, Ser. No. 751,203
Int. Cl. C07f 5/06
U.S. Cl. 260—448          5 Claims

ABSTRACT OF THE DISCLOSURE

In the preparation of aluminum alkyls by growth of low molecular weight aluminum trialkyls or aluminum dialkyl hydrides, the Poisson distribution is modified by a particular sequence of processing steps. Heavier by-product olefins formed in the growth reactor are separated with the lighter aluminum alkyls and are subjected to alkylation and growth to add onto the lower molecular weight aluminum alkyls.

---

This application relates generally to the production of aluminum alkyls via Ziegler chemistry. That is, the so-called growth process wherein low molecular weight aluminum alkyls, such as aluminum triethyl and aluminum diethyl hydride, are reacted with a low molecular weight olefin, such as ethylene, to produce high molecular weight aluminum trialkyls. More specifically, this invention provides a method of shifting the Poisson distribution so as to produce a high percent of aluminum trialkyls wherein the alkyl groups contain more carbon atoms in the intermediate range than would be obtained by the Poisson distribution. Such aluminum trialkyls are well known in the art and are valuable commercial products and are particularly useful for producing high molecular weight olefins, such as by reverse or thermo displacement, and are also useful for producing plasticizer and detergent range alcohols by oxidation and subsequent hydrolysis.

One method of synthesizing trialkyl aluminum is the so-called "growth process" wherein a low molecular weight trialkyl aluminum, such as triethyl aluminum or tripropyl aluminum or the corresponding dialkyl aluminum hydride, is reacted with an olefin of 2 to about 4 carbon atoms, preferably ethylene, under conditions which effect growth of the alkyl chains to a higher molecular weight trialkyl aluminum according to the equation:

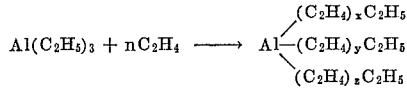

wherein $x$, $y$ and $z$ represent integers ranging from 0 to 14 (average 3–7) and $x+y+z=n$. This growth reaction is described in detail in, for example, U.S. Pat. No. 2,971,969 of Paul A. Lobo, issued Feb. 14, 1961, which is incorporated herein by reference; however, when trialkyl aluminum is prepared by this method, it is necessary to accept the entire spectrum of alkyl chain lengths, which are produced statistically according to the Poisson distribution equation $$Pn = \frac{m^n e - n}{n}$$

where Pn represents the probability that a certain hydrocarbon radical will be formed by $n$ additions of ethylene to the aluminum-ethyl bond originally present and $m$ is the mean number of additions of ethylene per growing chain. From the point of process economics, this has meant that it has been necessary to accept undesirable products, that is, products of lesser value, e.g., low molecular weight olefins or alcohols, in order to effect the synthesis of desired products. It is also known that the aluminum alkyls formed by the growth process can be displaced by low molecular weight olefins, e.g., aluminum tridodecyl can be reacted with ethylene to produce aluminum triethyl and dodecene. Consequently, during growth, some displacement takes place, and olefins other than ethylene will be in the effluent from the growth reactor. Many of these heavy olefins boil at substantially the same temperature as the low molecular weight aluminum trialkyls, e.g., dodecene and aluminum triethyl cannot be readily separated by fractionation. This separation can be accomplished, however, by adducting the aluminum compound with a suitable adducting compound such as tetramethylammonium chloride and subsequently heat decomposing the adduct.

According to this invention growth product is first fractionated into a light solvent-light olefin stream and a heavy olefin-heavy solvent-AlR$_3$ stream. AlR$_3$ represents aluminum trialkyl. The latter stream is then fractionated into a heavy AlR$_3$ stream and a light AlR$_3$-heavy olefin-heavy solvent stream, and this latter stream is sent to a thermal olefin alkylation zone wherein the heavy olefins come into contact with a ATE (aluminum triethyl) and ADEH (aluminum diethyl hydride) solution wherein the heavy olefins add onto the ADEH to produce ATA (aluminum trialkyl), e.g., aluminum diethyl-heavy olefin alkyl aluminum.

The figure is a schematic flow diagram of the process of this invention. Pumps, valves and the like, except where required to describe the invention, are omitted since such are well known in the art.

As pointed out above, all of the chemistry of this invention is known, and my contribution to the art resides in the particular combination of steps to obtain the desired goal. In general, it is desirable to obtain the C$_8$+ materials. That is, C$_6$ to C$_{10}$ alcohols are useful as plasticizer, and the C$_{12}$–C$_{24}$ on higher alcohols are particularly useful in detergent intermediates. Therefore, as used herein, higher alkyls or olefins will mean C$_{12}$+ whereas lower alkyls or olefins will mean C$_4$ or below, and the intermediate range olefins will include C$_6$ to C$_{10}$. The invention will also be described wherein aluminum triethyl and/or aluminum diethyl hydride is grown with ethylene. Those skilled in the art will recognize from the earlier workers in the art that any low molecular weight aluminum alkyl or aluminum alkyl hydride could be used as the starting material. Although the very early works indicated almost any olefin can be used for growth, later research has indicated only the ethylene and propylene can be successfully grown whereas the higher olefins merely dimerize. Therefore, for the purpose of this disclosure low molecular weight aluminum alkyls or dialkyl aluminum hydride will mean those aluminum compounds wherein the alkyl substituent contains 8 or fewer carbon atoms per alkyl substituent. It is, of course, within the skill of the art to make the separation at any desired point; but, since the C$_8$+ alcohols or olefins are generally the desired ones, the split between the C$_6$ and C$_8$ will be intended in this disclosure.

Referring now to the drawing, ATE and ADEH in a heavy solvent prepared by known methods are passed via conduit 1 to distillation zone 2. The ATE and ADEH along with a small amount of heavy solvent pass overhead via conduit 3 to thermal olefin alkylation zone 4. The solvent is recycled back to the ATE–ADEH preparation zone, not shown, via conduit 5. The ATE–ADEH is mixed with light solvent supplied via conduit 6 and light (low readily apparent that the product, e.g., stream 17, contains a drastically altered distribution from that coming from the growth reactor, stream 11. Similar results would be obtainable say for the $C_{16}+$ alkyls.

TABLE

| | Alkyls | | | | | Unreacted olefins | | | |
|---|---|---|---|---|---|---|---|---|---|
| | Solvent fractionator overhead Stream 13 | Growth product fractionator bottoms- Stream 17 | Growth product fractionator overhead Stream 19 | Feed to solvent fractionator Stream 11 | | Solvent fractionator overhead Stream 13 | Growth product fractionator bottoms- Stream 17 | Growth product fractionator overhead Stream 19 | Feed to solvent fractionator Stream 11 |
| C Number: | | | | | C Number: | | | | |
| 2 | 0.0 | 0.18 | 8.69 | 8.87 | 2 | 1.32 | 0.0 | 0.0 | 1.32 |
| 4 | 0.0 | 3.20 | 29.11 | 32.31 | 4 | 2.75 | 0.0 | 0.0 | 2.75 |
| 6 | 0.0 | 14.89 | 38.47 | 53.36 | 6 | 3.56 | 0.0 | 0.0 | 3.56 |
| 8 | 0.0 | 36.11 | 23.09 | 59.20 | 8 | 3.41 | 0.0 | 0.0 | 3.41 |
| 10 | 0.0 | 43.31 | 6.93 | 50.25 | 10 | 2.61 | 0.0 | 0.0 | 2.61 |
| 12 | 0.0 | 32.91 | 1.66 | 34.57 | 12 | 0.0 | 0.18 | 7.42 | 7.60 |
| 14 | 0.0 | 19.83 | 0.20 | 20.03 | 14 | 0.0 | 0.12 | 3.11 | 3.23 |
| 16 | 0.0 | 10.10 | 0.0 | 10.10 | 16 | 0.0 | 1.07 | 0.99 | 1.06 |
| 18 | 0.0 | 4.56 | 0.0 | 4.56 | 18 | 0.0 | 0.04 | 0.19 | 0.23 |
| 20 | 0.0 | 1.90 | 0.0 | 1.90 | 20 | 0.0 | 1.02 | 0.04 | 0.06 |
| 22 | 0.0 | 0.75 | 0.0 | 0.75 | 22 | 0.0 | 0.01 | 0.01 | 0.02 |
| 24 | 0.0 | 0.29 | 0.0 | 0.29 | 24 | 0.0 | 0.00 | 0.00 | 0.00 |
| 26 | 0.0 | 0.11 | 0.0 | 0.11 | 26 | 0.0 | 0.00 | 0.00 | 0.00 |
| 28 | 0.0 | 0.04 | 0.0 | 0.04 | 28 | 0.0 | 0.00 | 0.00 | 0.00 |
| 30 | 0.0 | 0.01 | 0.0 | 0.01 | 30 | 0.0 | 0.00 | 0.00 | 0.00 |
| 32 | 0.0 | 0.00 | 0.0 | 0.00 | 32 | 0.0 | 0.0 | 0.0 | 0.0 |
| Total | 0.0 | 168.20 | 108.16 | 276.36 | | 13.65 | 1.44 | 11.76 | 25.85 | molecular weight) aluminum trialkyl, heavy olefin and heavy solvent from conduit 7, and the heavy olefin adds onto the ADEH forming ATA (aluminum trialkyl). Generally an excess of olefins is present insuring complete alkylation and passes via conduit 8 along with $AlR_3$ (aluminum trialkyl) and solvent to growth reactor 9. The $AlR_3$ is a mixture of ATE and aluminum diethylalkyl wherein the alkyl corresponds to the olefin reacting with the ADEH. The $AlR_3$ is grown with ethylene supplied via conduit 10, and the growth product then passes via conduit 11 to fractionator 12. Light solvent and light olefins are taken overhead via conduit 13 to conduit 14. The light solvent is readily separated in subsequent operations from the desired product and is of no particular concern. The light olefins can be utilized later for reverse displacement along with additional ethylene if olefins are the desired product and can be readily separated from the alkoxides or alcohols if alcohols are the desired product. In some cases, it may be desirable to convert these light olefins to paraffins, since the olefins are more easily oxidized and could be a source of carbonyl compounds or impurities in the oxidized product. In this case, it is within the skill of the art to hydrogenate this stream. In any case the $AlR_3$, heavy olefins and heavy solvent pass from fractionator 12 to fractionator 16 via conduit 15. The heavy $AlR_3$ then passes via conduit 17 to join the effluent in conduit 14 and passes via conduit 18 to further processing. As has been stated, this may be to reverse displacement or to oxidation followed by hydrolysis, depending upon the desired product. The overhead, consisting of the low molecular weight $AlR_3$, solvent and olefins from zone or fractionator 16, passes via conduits 19 and 7 to zone 4 wherein it is reacted with the ATE–ADEH mixture as previously described.

As previously discussed, there is some undesired reverse displacement in the growth reactor 9, and the heavy olefins will build up to undesirable levels. Therefore conduit 20 with valve 21 is provided for occasional purge of such olefins. Of course, some of the light $AlR_3$ and heavy solvent will also be purged; however, the amount is very low, and this material then passes via conduits 14 and 18 to the further processing steps where they can be recovered.

To further illustrate how the alkyl chains on the ATA are concentrated toward the higher molecular weight materials, a partial material balance is shown in the following table. All figures are shown in million pounds. In the case shown, the interest is in the $C_8+$ materials. It is

Having thus described the invention in a preferred embodiment, I claim:

1. A process of altering the Poisson distribution of alkyl groups recovered from reacting a low molecular weight aluminum alkyl with a low molecular weight olefin by the growth process, said process consisting of:
   (a) subjecting a low molecular weight aluminum alkyl hydride to heavy olefin alkylation,
   (b) subjecting the product of step (a) to growth with a low molecular weight olefin whereby aluminum alkyls are produced along with some displaced olefins,
   (c) subjecting the product from step (b) to a first separation wherein light weight olefins are removed from the heavy olefins and the aluminum alkyls,
   (d) subjecting the heavy olefins and aluminum alkyls to a second separation step wherein low molecular weight aluminum alkyls and olefins are separated and recycled to step (a) to provide the olefins for said thermal olefin alkylation, and
   (e) removing the high molecular weight aluminum alkyls as product.

2. The process of claim 1 wherein the separation of steps (c) and (d) is by distillation.

3. The process of claim 1 wherein the low molecular weight aluminum alkyl of step (a) comprises in addition to the recycle from step (d) diethyl aluminum hydride and the low molecular weight olefin of step (b) is ethylene.

4. The process of claim 1 wherein the low molecular weight aluminum alkyl of step (a) in addition to the recycle from step (d) consists of aluminum triethyl and aluminum diethyl hydride, and the low molecular weight olefin of step (b) is ethylene.

5. The process of claim 2 wherein the low molecular weight aluminum alkyl of step (a) in addition to the recycle from step (d) consists of aluminum triethyl and aluminum diethyl hydride, and the low molecular weight olefin of step (b) is ethylene.

References Cited

UNITED STATES PATENTS

| 2,906,794 | 9/1959 | Aldridge et al. | 260—448A |
| 3,293,274 | 12/1966 | Feighner | 260—448A |
| 3,423,444 | 1/1969 | Atwood | 260—448A |
| 3,445,494 | 5/1969 | Acciarri | 260—448A |

TOBIAS E. LEVOW, Primary Examiner

H. M. S. SNEED, Assistant Examiner